United States Patent [19]

Journee

[11] Patent Number: 5,086,534
[45] Date of Patent: Feb. 11, 1992

[54] WINDSHIELD WIPER INCORPORATING A DEFLECTOR

[75] Inventor: Maurice Journee, Chaumont-en-Vexin, France

[73] Assignee: Paul Journee S.A., Colombes, France

[21] Appl. No.: 475,313

[22] Filed: Feb. 5, 1990

[30] Foreign Application Priority Data

Feb. 8, 1989 [FR] France ................... 89 01626

[51] Int. Cl.$^5$ ................................................ B60S 1/04
[52] U.S. Cl. .................... 15/250.2; 15/250.42
[58] Field of Search ............ 15/250.2, 250.19, 250.21, 15/250.23, 250.42, 250.35; 416/223 R, 229 R, 240, 241 R, 241 A

[56] References Cited

U.S. PATENT DOCUMENTS

| | | | |
|---|---|---|---|
| 2,033,345 | 3/1936 | Lee | 416/240 |
| 3,294,366 | 12/1966 | Coplin | 416/241 A |
| 4,590,638 | 5/1986 | Beneteau | 15/250.42 |

FOREIGN PATENT DOCUMENTS

| | | | |
|---|---|---|---|
| 0210420 | 6/1987 | European Pat. Off. | |
| 0253696 | 1/1988 | European Pat. Off. | 15/250.19 |
| 2346100 | 4/1975 | Fed. Rep. of Germany | 15/250.2 |
| 3637348 | 5/1988 | Fed. Rep. of Germany | |
| 2106775 | 4/1983 | United Kingdom | |

Primary Examiner—Harvey C. Hornsby
Assistant Examiner—Gary Graham
Attorney, Agent, or Firm—Dennison, Meserole, Pollack & Scheiner

[57] ABSTRACT

This invention is concerned with a windshield wiper incorporating a deflector. The windshield wiper is characterized in that the deflector comprises a rigid, shaped, flat core element covered on at least one of its faces with a flexible material which is extended beyond the edge of the core element at the edge of the deflector nearest to the windshield, so as to cover this edge. The invention is applicable to the automotive industry.

5 Claims, 2 Drawing Sheets

WINDSHIELD WIPER INCORPORATING A DEFLECTOR

FIELD OF THE INVENTION

This invention relates to a windshield wiper, incorporating a deflector, for an automotive vehicle.

BACKGROUND OF THE INVENTION

The use of deflectors which are fixed to a windshield wiper has proved necessary in order to avoid disengagement of the wiper under the influence of the aerodynamic forces which are set up by the air flows impinging on the wiper blade, and on its connection with the wiper arm, when the vehicle is travelling at high speed. Such deflectors ought ideally to have a free edge as close as possible to the glass that is to be swept. This is in order to reduce the gap between the glass and the free edge of the deflector, since air tends to be funnelled at high speeds through this gap when the vehicle is travelling fast.

However, the possibility of obtaining such close proximity between the free edge of the deflector and the glass is limited in practice, firstly by the curvature of the windshield, and secondly by the risk that the free edge of the deflector can come into contact with the glass, with a consequent risk of abrasion of the glass. This would in due course be detrimental to good visibility by the driver.

In order to overcome this disadvantage, in the published patent application No. DE 3 637 348A of the Federal Republic of Germany, it has been proposed that the lower part of the deflector, that is to say the part closest to the glass, should be in a material that is generally softer than the remainder of the deflector. This arrangement does however make it necessary not only to manufacture the deflector in two parts, but also to introduce the resulting problem of ensuring that the joint between these two parts is not easily separated. Such an assembly is therefore costly, and the joint between the two parts can be detrimental both to the aesthetic appearance of the wiper and to the aerodynamic characteristics.

In published European patent application No. EP 0 210 420A, it is proposed to mould a deflector in synthetic material on to a windshield wiper arm. Such a deflector gives no protection to the wiper blade and to the interface of the latter with the remainder of the windshield wiper, due to the position of the deflector on the wiper arm. In addition, in such an arrangement the deflector cannot be very securely fixed on the arm, which has a transverse cross section that is very small by contrast with the overall cross section of the wiper itself.

SUMMARY OF THE INVENTION

An object of the invention is to provide a windshield wiper with a deflector incorporated, in which the deflector is fixed securely to the windshield wiper, while being provided with a flexible lip at its lower or free edge closest to the glass to be wiped, and thus to enable both the wiper blade and the joint between the blade and the wiper arm to be shielded.

A further object of the invention is to confer a high mechanical strength on the windshield wiper without any significant increase in its mass.

To this end, the windshield wiper according to the invention is characterised by the fact that the deflector comprises a rigid, profiled flat core or substrate element which is covered on at least one of its faces with a flexible material, which is extended at the lower or free end of the deflector while covering the adjacent end of the core element.

The deflector according to the invention is thus fully bimaterial, with a central rigid core, which may be in plastics material or in metal and which is partly or fully clad with a flexible skin. The deflector may thus be made from a coated metal and be shaped in such a way that it is able to be given very thin cross sections while not presenting any sharp angles.

The invention will be more clearly understood on a reading of the description which follows, which is given by way of example only and with reference to the accompanying drawings.

DESCRIPTION OF PREFERRED EMBODIMENTS OF THE INVENTION

Figure 1:
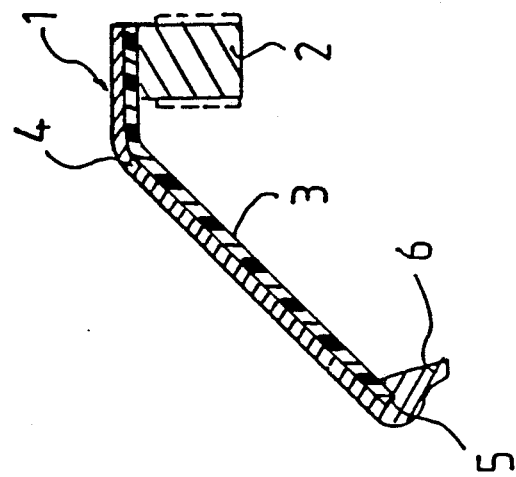
FIG. 1 is a diagrammatic view in cross section, showing part of a windshield wiper with a deflector incorporated therein, in accordance with one embodiment of the invention.

In the drawings, a deflector 1 is shown carried on a windshield wiper (not shown) by means of fingers 2 which engage the wiper by means of a snap fit.

It is well known that, due to the fingers 2, the deflector 1 may be disposed in one component of the windshield wiper, for example the large bridge piece of the wiper or an arm shaped to form a housing. Similarly, the deflector may be arranged to project directly from another component of the windshield wiper, such as the armature of the wiper or the wiper arm.

Figure 2:
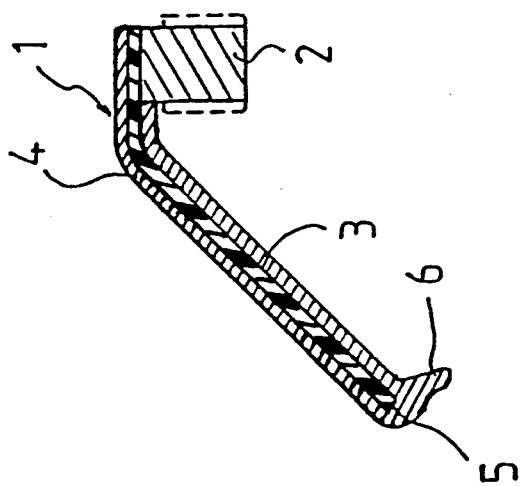
FIG. 2 is similar to FIG. 1, but shows a further embodiment.

Referring to FIGS. 1 and 2, the deflector 1 comprises a rigid, flat core or substrate element 3, which may be made in a metal or a plastics material and which is covered by a skin 4 of flexible material. In FIG. 1, the skin 4 covers both faces of the flat element 3, while in FIG. 2 the skin is only provided on the front face of the deflector 1. The skin 4 extends up to the terminal edge 5 of the core element 3, so as to cover the latter and to form a terminal bead, thus providing a layer of the soft skin material facing towards the glass that is to be swept. This removes any risk of damage to the glass. Preferably, and as is best seen from the drawings, the skin 4 is extended to form a projection in the region of the lower edge 5 of the core element 3. In this example, this projection is in the form of a flexible lip 6, which projects from the rear face of the core element 3 in a direction substantially at right angles to the general direction of the glass to be swept.

The assembly may be made of coated metal, coating being carried out by a moulding process or by any other suitable method. It does not present a sharp angle, and may be arranged to have an optimum ratio of mass to mechanical strength. The skin 4 can be arranged to protect the core element 3, with the latter being buried within it, so that the core element can be made in a material less resistant to corrosion and need not receive any treatment, such as painting, to modify its appearance.

Figure 3:
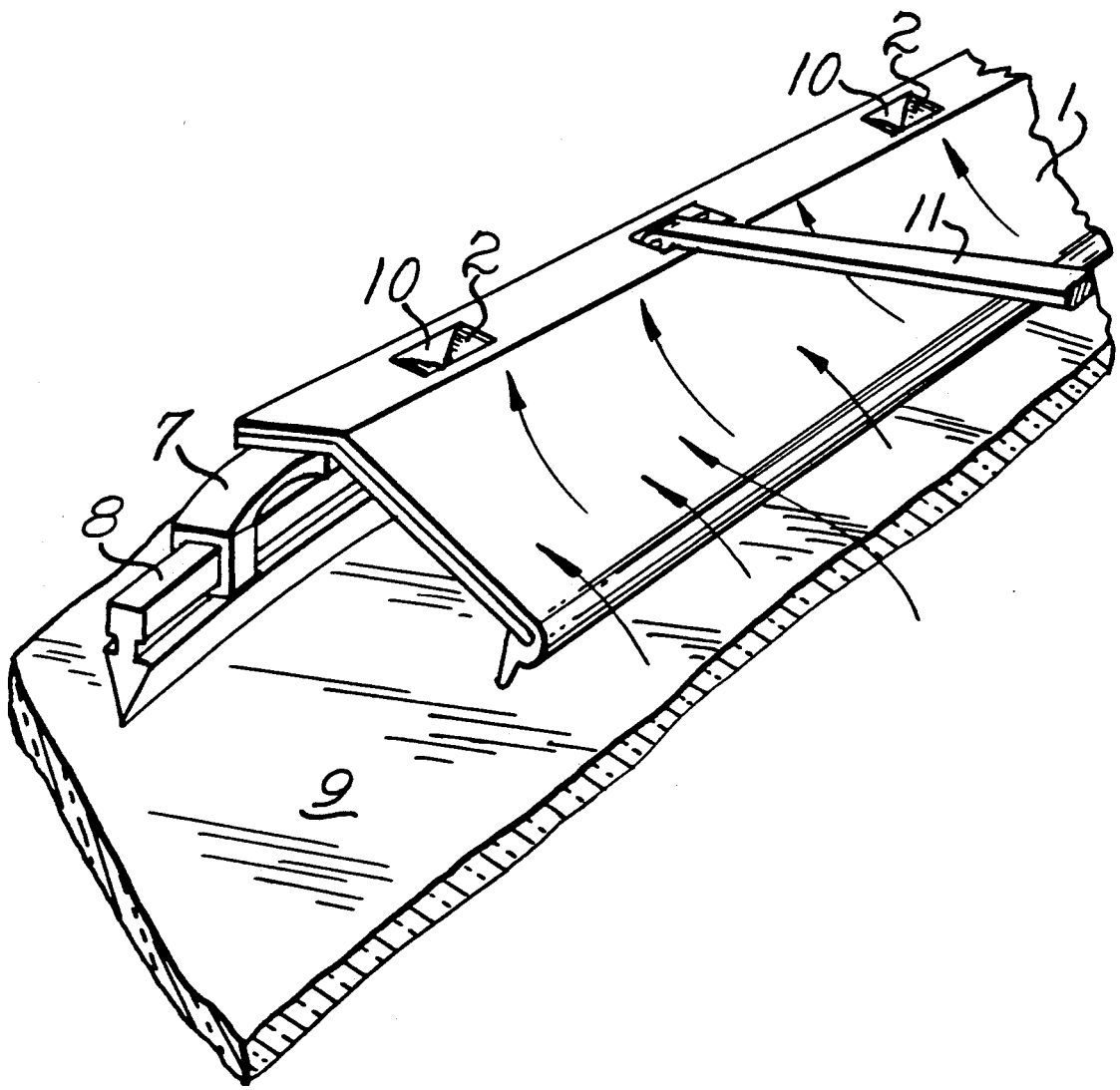
FIG. 3 shows the deflector installed on a conventional windshield wiper.

FIG. 3 shows the deflector 1 attached to the bridge piece 7 of a conventional windshield wiper. The wiper blade 8 is carried by the bridge piece 7 for wiping movement over windshield glass 9. The deflector 1 is attached to the bridge piece by means of fingers 2 which depend from the deflector and which are snapped into holes 10 conventionally applied to the upper surface of the bridge piece. The bridge piece is driven by oscillating arm 11. The arrows indicate air flow.

In addition, because of the way the deflector according to the invention is constituted, it can be made in any shape, or to any curvature, that may be desired.

What is claimed is:

1. A windshield wiper for an automotive vehicle, wherein the wiper incorporates a deflector having a front face facing away from a windshield including a glass surface and a rear face facing the windshield and having a free edge to lie adjacent to the windshield glass surface to be swept by the wiper, said deflector comprising a rigid, flat, profiled core element covered on at least one surface by a soft flexible material to form at least one of said deflector faces, said core element having a terminal edge adjacent said free edge, said flexible material extending over and covering said terminal edge and extending beyond and downwardly thereby defining said free edge facing said windshield glass to prevent abrasion of the glass.

2. A windshield wiper according to claim 1, further comprising a flexible lip projecting from said terminal edge covered by the flexible material.

3. A windshield wiper according to claim 2, wherein said lip projects from the rear face of the deflector.

4. A windshield wiper according to claim 1, wherein the deflector is of metal covered by soft plastic material.

5. A windshield wiper according to claim 1, wherein the deflector is carried on a component of the windshield wiper.

* * * * *